Nov. 16, 1965   H. J. MACIE   3,217,965
SHIPPING AND STORAGE CONTAINERS AND MEANS
FOR PALLETIZING THE SAME
Filed Sept. 23, 1963   2 Sheets-Sheet 1
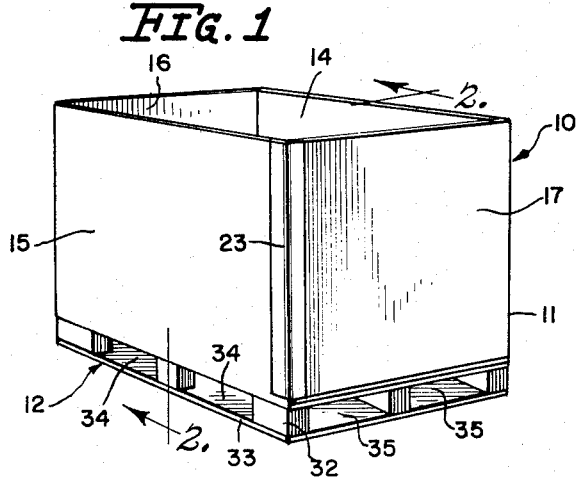
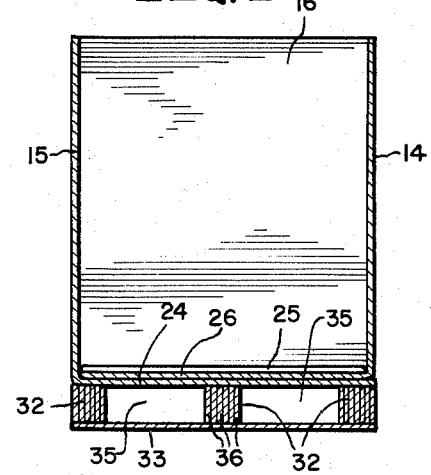
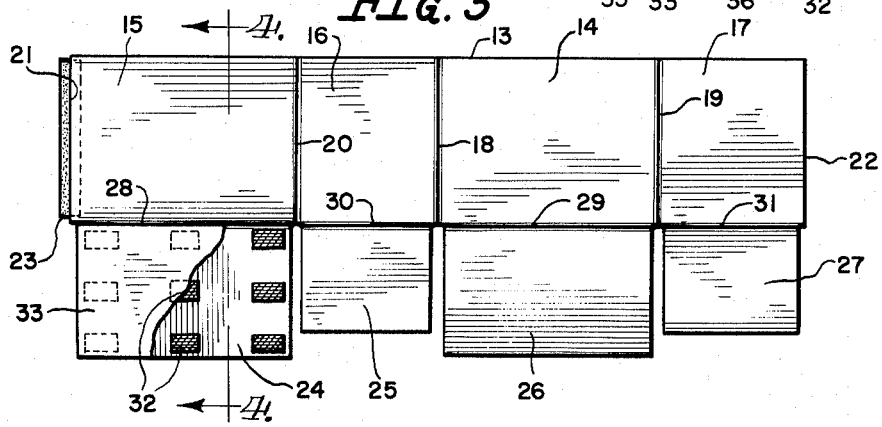
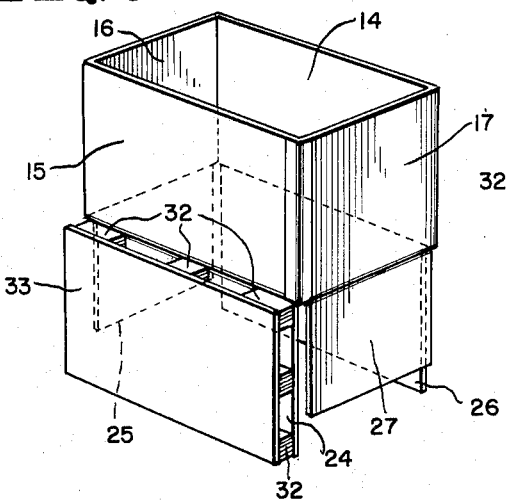
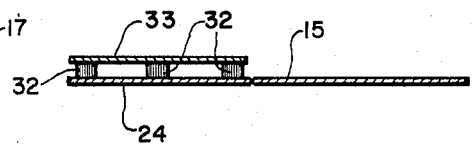
INVENTOR.
Henry J. Macie
BY
Frederick J. Krube
Atty.

Nov. 16, 1965     H. J. MACIE     3,217,965
SHIPPING AND STORAGE CONTAINERS AND MEANS
FOR PALLETIZING THE SAME
Filed Sept. 23, 1963     2 Sheets-Sheet 2
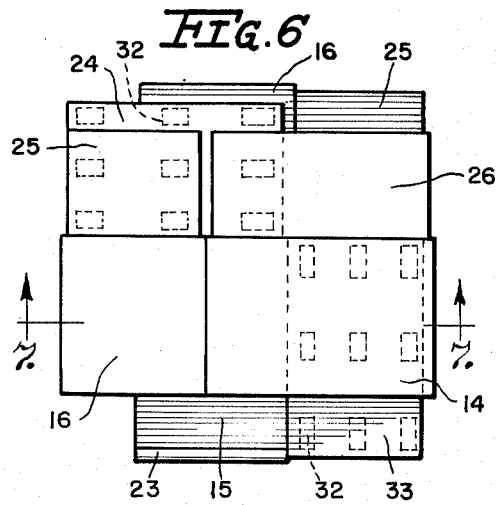
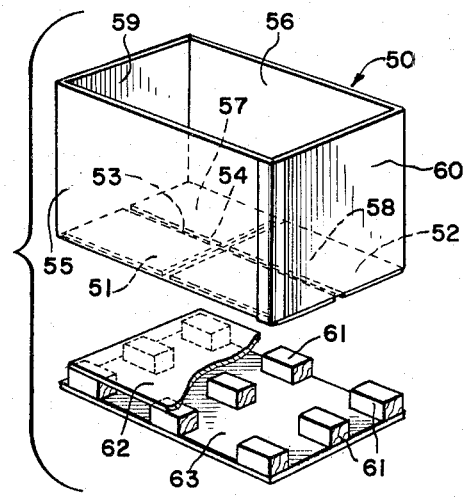
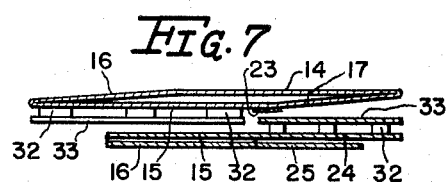
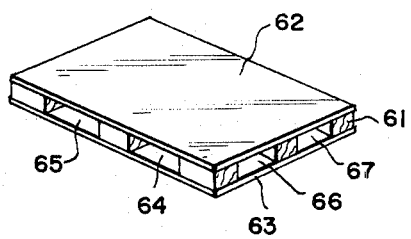
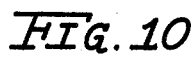
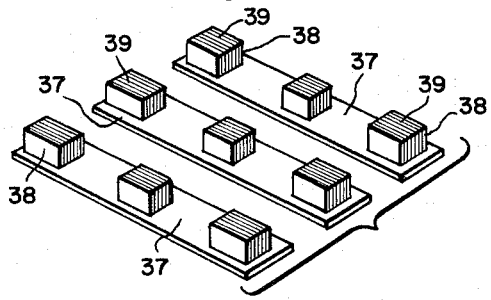
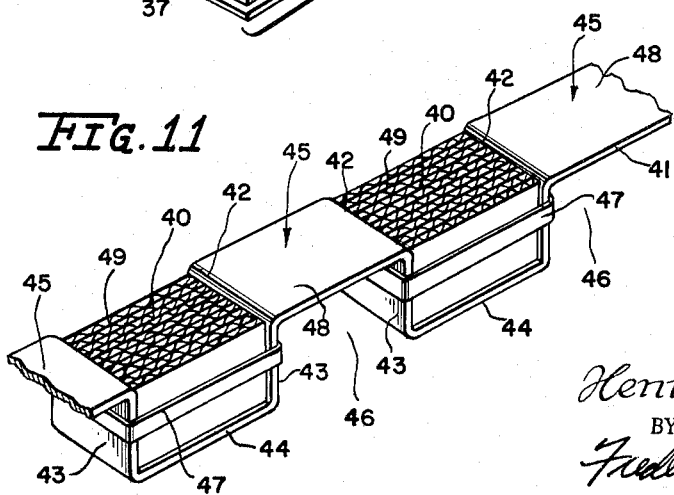

3,217,965
SHIPPING AND STORAGE CONTAINERS AND
MEANS FOR PALLETIZING THE SAME
Henry J. Macie, 5350 8th Ave., La Grange, Ill.
Filed Sept. 23, 1963, Ser. No. 310,633
2 Claims. (Cl. 229—6)

This invention relates to shipping and storage containers and means for palletizing the same, and, more particularly, to a new and improved knock-down type, paperboard shipping and storage box or bin and means for incorporating pallet means therein whereby the box or bin is capable of being transported and handled by means of a conventional industrial fork lift truck.

It is generally conceded by those cognizant of the multitude of problems, including economic as well as engineering, encountered in the material handling field that any material handling system for supporting goods during transport about and storage in warehouses, as well as during transport from one warehouse to distant warehouses in order to be efficient from economic and engineering standpoints must, of necessity, involve the use of some form of load supporting platform or pallet means. Instead of individually loading and stacking each package, item, sack, etc., most material handling systems and practices involve the stacking or grouping of a number of articles in a particular manner and the treating of each group of articles or goods as a load unit. It is recognized that at each stage of loading, unloading, stacking, and restacking valuable and costly time is saved if the load unit is capable of being handled with an industrial lift truck and in order to render the load unit capable of being handled with an industrial lift truck, some form of pallet means is used in conjunction with the load unit whereby the pallet means is capable of receiving the spaced, horizontally projecting forks or tines of a conventional lift truck. The forks or tines are insertable beneath or through the pallet means so that the load unit may be lifted and moved to the desired location and deposited there. The saving in handling labor is considerable when goods may be palletized and shipped through with the pallet to their destination.

A serious drawback exists in the use of certain types of pallets because of their heavy weight and relatively high initial construction and maintenance costs. Obviously the pallets or platforms which form part of the palletized load unit are carried in through transportation by common carriers at the same rates as the palletized commodity. This type of pallet or platform, therefore, contributes a considerable part of the total shipping cost because of its own weight. To overcome the above and other drawbacks, material handling engineers have developed pallets which are constructed in such a manner that they are relatively inexpensive to construct and, thus, can be disposed of after use with a single load unit. Such pallets take many froms but are generally constructed of inexpensive materials such as corrugated paperboard or the like. While the low cost of such expendable pallets resulted primarily from the low cost of the materials used in forming the pallets, other costs and expenses are involved which add to the overall cost of a material handling system utilizing expendable pallets. The vast majority of expendable pallets currently in use are somewhat complicated in design and construction and generally require the use of a specialized jig or fixture by the shipper to construct the pallet, which, oftentimes, is an expensive item. Furthermore, personnel skilled in the use and operation of the specialized jig or fixture is necessary to construct the expendable pallet. On the other hand, if the shipper received the pallets preformed, the problem of storing the pallets by the shipper before using them becomes critical.

The problems encountered by the material handling engineer become more complex and more difficult to solve when he is given the task of providing an efficient material handling system for shipping and storing bulk material and/or bulky articles which require a bin, box or like container for confining the same. As in the case of pallets per se, the container, heretofore, added considerably to the total shipping cost because of their own weight. Furthermore, the containers were expensive to initially purchase and maintain in good working order and thus required a relatively large investment on the part of the user. Heretofore, such containers were oftentimes themselves quite bulky and of heavy weight and thus the user had the vexing problem of storing the containers before placing them in use. In an effort to overcome the container storage problem, many material handling systems involve the use of knock-down type containers, but, heretofore, such containers were complex in construction and, hence, expensive to purchase, and generally required a considerable length of time to set up and prepare for use. Furthermore, considerable effort was expended and valuable labor time was consumed in palletizing or rendering the containers suitable for handling by an industrial lift truck prior to use.

It is, therefore, the primary objective of the present invention to provide a new and improved light-weight, collapsible shipping and storage container suitable for bulky articles and/or bulk materials and simple and inexpensive means for palletizing the container whereby the the container is capable of being transported and handled by means of a conventional industrial fork lift truck. The present invention involves the utilization of inexpensive expendable pallet means constructed entirely of corrugated paper board, or, alternatively, of corrugated paper board and wood which is capable of being easily and quickly attached to the wall of a conventional corrugated paper board box-like container for palletizing the same without the need of any special tools or fixtures or requiring the efforts of skilled personnel. Because the pallet means as well as the palletized container utilizing the pallet means of the present invention are expendable, pick-up and return schedules, deposits and chargebacks, pallet and container maintenance and cumbersome handling and stock piling of the same is completely eliminated. Inasmuch as the palletized container of the present invention is constructed principally of light weight corrugated paper board and does not involve the use of nails or the like in the construction, the possibility of anyone being injured by protruding nails or splinters is eliminated.

A further object of the present invention is to provide an expendable, collapsible box-like, palletized container which when not being used and when in its collapsed condition, occupies a relatively small amount of space, but which is capable of being readied for use easily in a matter of seconds without the need of any tools and/or fastening means such as nails, adhesives, etc. whatever.

A further object of the present invention is to provide an expendable collapsible storage and shipping container which may be set up or assembled easily and quickly on the job just prior to use or, alternatively, be preassembled and stored in a collapsed condition until ready to use the same.

Still another object of the present invention is to provide an uniquely constructed four-way entry storage and shipping bin which is capable of being readily transported or moved about the warehouse and loaded on to and unloaded from a railroad freight car or other carrier by means of a conventional industrial fork lift truck and without the necessity of providing any special or unorthodox attachments such as load grippers, clamps, and the like for the lift truck.

A still further object of the present invention is to provide a simply constructed shipping and storage bin capable of supporting relatively heavy loads which involve a minimum number of relatively light weight, inexpensive components and a simple method for palletizing the bin so that the forks or tines of a conventional life truck may be accommodated in order to transport and handle the bin.

The foregoing and other important objects and desirable features inherent in and encompassed by the invention, together with the many purposes and uses thereof, will become readily apparent from a reading of the ensuing description in conjunction with the annexed drawings, in which FIGURE 1 is a perspective view of a palletized shipping and storage container embodying the invention; the container is shown in its assembled condition and ready for use;

FIGURE 2 is a vertical sectional view taken substantially along line 2—2 of FIGURE 1;

FIGURE 3 is a plan view of a partially constructed shipping and storage container prior to forming, wherein the bottom, sides and ends are shown lying in a common plane;

FIGURE 4 is a vertical sectional view taken substantially along line 4—4 of FIGURE 3;

FIGURE 5 is a perspective view of a combination container and pallet at one stage of the assembly and construction thereof;

FIGURE 6 is a plan view of a stack of shipping and storage containers and wherein the containers are in their collapsed condition;

FIGURE 7 is a vertical sectional view taken substantially along line 7—7 of FIGURE 6 illustrating the manner in which the collapsed containers are nested upon each other to conserve space;

FIGURE 8 is an exploded, perspective view of a palletized slotted type corrugated paper board carton;

FIGURE 9 is a perspective view of the pallet or platform utilized in the construction of the shipping and storage container illustrated in FIGURE 8;

FIGURE 10 is a perspective view of a modified form of pallet construction; and

FIGURE 11 is a fragmentary perspective view of still another form of pallet construction.

Referring to the drawings in detail wherein like reference characters represent like elements throughout the various views, a palletized shipping and storage container embodying the invention is designated generally by numeral 10. Referring specifically to FIGURES 1 through 7, the container 10 broadly includes a collapsible box-like bin 11 for containing the load and pallet means, designated generally by numeral 12, for palletizing the bin 11 to permit the bin 11 to be transported and stacked by conventional industrial lift trucks. The type of material that may be utilized in this particular bin assembly may be of the cardboard of paper board type. This type of material is, of course, well known in the paper or box industry and consists primarily of a layer or two or more separated layers of paper having a corrugated section attached thereto or corrugated sections disposed therebetween as in the case of multiple paper layers. The present invention is, of course not limited to any particular type of material though it has been found that corrugated paper board of all kinds is both inexpensive and particularly well adapted to the container construction under consideration and for achieving the objects of the invention. The bin 11 possesses constructional features not unlike those of a conventional corrugated paper board carton and preferably is formed from a single sheet 13 of corrugated paper board as shown in FIGURE 3. As illustrated in FIGURE 3, sheet 13 of corrugated paper board is formed to provide a pair of generally rectangularly shaped panels 14, 15 which serve as the vertical side walls of the bin 11 when in its assembled condition and ready for use, as illustrated in FIGURE 1. The sheet 13 is also formed to provide a pair of spaced panels 16, 17 which serve as the end walls of the assembled bin 11. In general corrugated paperboard material may be made to suitably hinge or be folded by merely scoring or weakening the material along so-called score, fold or hinge lines. The marginal edges of the side wall panel 14, which are vertically disposed when the bin 11 is in its assembled, ready-to-use condition, are hingedly connected to an edge of each end wall panel 16, 17 at fold lines 18, 19, respectively. In a similar manner the side wall panel 15 is hingedly connected to the remaining vertical edge of the end wall panel 16 at a fold line 20. The free edge 21 of the side wall panel 15 parallel to the fold line 20 is suitably hingedly connected to the edge 22 of the end panel wall 17 parallel to the fold line 19 by means of adhesive and a tape strip 23. It is to be understood that other hinge connection means may be employed for joining the sidewall panel 15 to the end wall panel 17 without departing from the spirit and scope of the invention.

Hingedly connected to the edges of the side wall panels 15, 16 and end wall panels 16, 17 generally lying in a common plane perpendicular to the fold lines 18, 19 and 20 are four panels 24, 25, 26 and 27 which serve as the bottom wall of the bin 11 when in its assembled, ready-to-use condition, as shown in FIGURE 1. The panel 24, which is hingedly connected to side wall panel 15 at fold line 28, and panel 26 which is similarly connected to side wall panel 14 at fold line 29, are of substantially the same overall size and have a length slightly smaller than the length of a side wall panel and a width slightly smaller than length of an end wall panel measured between the fold lines 18, 20. The panels 25, 27 on the other hand, which are hingedly connected to the end wall panels 16 and 17, respectively, at fold lines 30 and 31, are of the same overall size and each has a length measured perpendicular to the fold lines 30, 31 slightly less than one half of the length of a side wall panel 14, 15. From the foregoing, it will be appreciated that when the bin 11 is fully assembled and in its uncollapsed condition, as shown in FIGURE 1, the panels 25 and 27 extend inwardly and perpendicularly from the end wall panels 16, 17, respectively, and lie substantially in the same plane with the free innermost edges thereof being disposed closely adjacent to each other. When the bin 11 is in its collapsed state, the side wall panel 15, the end wall panel 17, the large bottom panel 24, and the small bottom panel 27 all lie substantially in a common plane and similarly the remaining panels 14, 16, 25 and 26 all lie substantially in a common plane directly thereabove. Thus, the bin 11, when in its collapsed condition has a thickness of approximately twice the thickness of the corugated paper board sheet 13. Thus, the bin 11 occupies a minimum amount of storage space and is readily adapted for shipment when in its collapsed and substantially flat form.

The means for palletizing the bin 1 shown in FIGURE 1 or for supporting the bottom of the assembled bin 11 above a floor to permit ready engagement of the tines or forks of a conventional industrial lift truck therebeneath includes a plurality (nine being shown) of spacer blocks or legs 32 arranged in three rows of three blocks each located adjacent to the edges and medially of the bottom panel 24. The blocks 32 are attached to the surface of the bottom panel 24 which faces outwardly or downwardly when the container 10 is ready for use by means of a suitable adhesive. A rectangularly shaped base member 33 of a single sheet of corrugated paperboard material and having substantially the same configuration as the bottom panel 24 is also secured to the spacer blocks 32 by means of a suitable adhesive. The base member 33 and bottom panel 24 are substantially in alignment. Because of the disposition of the spacer blocks 32 with reference to the base member 33 and the bottom panel 24 maximum support of the bin 11 is provided while at the same time spaces or passageways 34, 35 are afforded at the sides and ends, respectively, of the storage container 10 for the reception of the spaced and parallel forks or tines of a conventional industrial lift truck. Thus, when the palletized container 10 is ready for use, as shown in FIGURE 1, the fork lift truck operator may approach the container 10 from any one of its four sides. The base member 33 provides additional bearing area for distributing the weight of the load carried by the bin 11 and also serves to strengthen and rigidify the pallet means by structurally interconnecting the spacer blocks 32 to prevent inadvertent lateral displacement of the blocks 32 with respect to each other during use of the palletized container 10.

In the pallet structure shown in FIGURE 1, the spacer blocks 32 are each constructed of a plurality of flat corrugated paper board, rectangularly shaped pieces 36 which are adhesively or otherwise permanently secured together flatwise or back-to-back. The corrugations of the pieces 36 are arranged perpendicular to the planes of the bottom panel 24 and the base member 33 and, consequently, vertically disposed columns of considerable compressive strength and capable of supporting heavy loads are provided.

From the foregoing it is believed the manner in which the palletized container 10 is used in obvious. The bin 11 with the pallet means affixed thereto, is supplied to the shipper or other user in its collapsed condition. As shown in FIGURE 7, the collapsed, palletized containers 10 are capable of being nested with the bottom panel 24 and base member 33 of a collapsed container 10 disposed in substantially the same plane and extending at right angles to the bottom panel 24 and base member 33 of an adjacent collapsed container 10. In this manner, the palletized containers may be stacked by the shipper until ready to be used. Consequently, a minimum amount of storage space is required to store the palletized containers 10. Furthermore, since the pallet means 12 as well as the bin 11 is constructed entirely of corrugated paperboard material which is relatively light in weight, the cost to ship the palletized containers in their collapsed condition to the ultimate user is kept small.

To assemble or erect one of the palletized containers 10 to render it suitable for loading, the bin 11 is first unfolded on the hinge lines 21, 20, 18, 19, 22 where the panels 14, 15, 16, 17 are interconnected to each other until the side wall panels 14, 15 are spaced and parallel with respect to each other, as shown in FIGURE 5. When in this partially assembled condition, the end wall panels 16, 17 extend substantially at right angles to the side wall panels 14, 15 and the bottom panels 24, 25, 26, 27 depend from the panels 15, 16, 14, 17, respectively, as shown in FIGURE 5. The relatively short bottom panels 25, 27 are then folded inwardly from the end wall panels 16, 17 respectively, and in a like manner, the bottom panel 26 is folded and caused to abut the undersides of the folded bottom panels 25, 27 in overlapping relation therewith. Thereafter, it is merely necessary to swing the bottom panel 24 together with the attached spacer blocks 32 and base member 33 at the hinge line 28 until the bottom panel 24 abuts the underside of the bottom panel 26, as shown in FIGURE 2, to complete the erection of the palletized container 10. The weight of the load to be carried by the container 10 maintains the panels 24, 25, 26 and 27 firmly in operative engagement with each other without the need of any additional fastening means such as adhesives, staples or like securing means. However, it may be desirable in certain shipping and storing operations to provide a cap or cover (not shown) for closing the open top of the container 10 and may also be desirable to band or to provide encircling straps around the bin 11 to strengthen and rigidify the same. It is to be understood that such modifications are contemplated and are within the spirit and scope of the invention. It is further contemplated the invention to treat all or part of the components utilized in the construction of the palletized container 10 with known water-repellant materials of all types and to employ waterproof adhesives if the container 10 is likely to be subjected to damp or outdoor weather conditions.

In certain material handling operations, it may be more advantageous to palletize the bin 11 just prior to the time when it is to be packed and used. FIGURES 10 and 11 disclose two alternative forms of pallet means for palletizing the bin 11. The pallet means shown in FIGURE 10 comprises three elongated strips or runners 37 constructed of corrugated paperboard material. The runners 37 are each of the same length which is substantially the same as the length of one wall of the erected or assembled bin 11. Each runner 37 has three longitudinally spaced, spacer blocks 38 fixed thereto by means of adhesive or the like. Two of the blocks 38 of each runner 37 are adjacent respective opposite ends thereof and the other block 38 is spaced substantially midway therebetween. The spacer blocks 38 are constructed in the same manner as the spacer blocks 32 and the corrugations of the laminated blocks 32 extend perpendicular with respect to the surface of the runners 37 to which they are permanently secured. The runners 37 together with the spacer blocks 38 fixed thereto are preferably supplied to the shipper as a subassembly.

In use, the assembler merely unfolds and erects a corrugated paperboard bin 11 in the same manner as pointed out hereinbefore. Adhesive is then applied to the surfaces 39 of the spacer blocks 38 and the runners 37 are arranged on and the surfaces 39 pressed into bonding engagement with the bottom panel 24 of the erected bin 11. The runners 37 extend longitudinally with respect to the bottom panel 24 with two of the runners 37 adjacent the fold lines 28, 29 and the third runner 37 laterally spaced midway therebetween. From the foregoing, it will be appreciated that the runners 37 impart rigidity and stability to the spacer blocks 38 and serve as a supporting base means for the spacer blocks 38. It will also be appreciated that the relative arrangement and spacing of the spacer blocks 38 is such that the forks or tines of an industrial lift truck may be readily inserted between the runners 37 and bottom panel 24 from any of the four sides of the bin 11 to raise and transport the same.

The pallet means disclosed in FIGURE 11 comprises a plurality of laminated corrugated paperboard spacer blocks 40. Each spacer block 40 is disposed and confined within a respective one of a plurality of spaced pockets. The pockets are formed in a single strip 41 of corrugated paperboard material by folding the strip 41 on a plurality of longitudinally spaced, laterally extending hinge or fold lines 42. Each pocket is generally U-shaped in side elevation and is partially defined by a pair of longitudinally spaced and parallel vertical wall sections 43 and a horizontal web section 44. Interconnecting each pair of adjacent pockets is a horizontally disposed spacer section 45. Each spacer section 45 and the vertical wall sections 43 hingedly connected thereto define a passageway 46 for receiving the tine of a fork lift truck laterally therethrough. It is to be understood that the length of the spacer section 45 is such so as to space the vertical wall sections 43 associated therewith a distance great to accommodate the fork lift tine without any interference.

As shown in FIGURE 11, each laminated spacer block 40 substantially fills the pocket associated therewith. A band 47 of gummed paper or cloth, lying substantially in a plane parallel and spaced intermediate the spacer sections 45 and the web sections 44, encircles each pocket and spacer block 40. The band 47 is adhesively secured to the wall sections 43 and the spacer block 40 and serves to not only prevent lateral displacement of the spacer block 40 with resepct to the pocket in which it is disposed but also to strengthen and rigidify the pockets by preventing the vertical wall sections 44 from pulling away from the spacer blocks 40 in use.

Preferably a preassembled strip 41 having a multitude of spacer blocks 40 fixed thereto is supplied to the shipper. When the shipper desires to construct a palletized container 10, he merely unfolds and erects a corrugated paper board bin 11 in the manner pointed out hereinbefore with reference to the use of the pallet means disclosed in FIGURE 10. Thereafter, three identical pieces are cut from the strip 41. Each piece has the same number and arrangement of spacer blocks 40 fixed thereto and a length substantially equal to the length of the bottom panel 24 or other panel of the bin 11 to which it is to be secured. Adhesive is applied to the uppermost surfaces 48, 49 of the spacer sections 45 and the spacer blocks 40, respectively, as viewed in FIGURE 11, of each piece and the pieces are positioned and secured to the bottom panel 24 in the same manner in which the runners 37 are fastened to the bottom panel 24 whereby each passageway 46 of each piece is in lateral alignment with respective passageways 46 of the other pieces. Furthermore, since adjacent pieces are laterally spaced with respect to each other a distance sufficient to accommodate the tine of a fork lift truck, the palletized container 10 utilizing the pallet means of FIGURE 11 may be approached from any one of the four sides thereof.

From the foregoing it will be appreciated that the shipper who is confronted with the problem of palletizing containers of a multitude of different sizes may find it more advantageous to employ the pallet means disclosed in FIGURE 11 since the number and the disposition of supporting spacer blocks required in a given situation depends on the size of the bin 11 and the weight of the load to be carried thereby. By merely stocking preassembled strips 41 of but a single size, a large variety of different sizes and shapes of palletized containers 10 may be readily assembled and constructed. It is not necessary to have on hand a large inventory of pallet components of various sizes and shapes to solve the problem.

In all of the embodiments of the invention disclosed above, the bottom panel 34 or the panel to which the spacer blocks are attached serves as the raised platform of the pallet means. This is permitted since the bottom panel 34 of the particular type of bin 11 utilized is coextensive with the bottom wall of the bin 11. In other words, the bin 11 is of the full bottom flap type and the bottom panel 34, being a single flat member, tends to structurally interconnect the spacer blocks. When it is desired to palletize a collapsible bin 50 of the so-called slotted type as shown in FIGURE 8, wherein the bottom panel thereof is, in reality, formed from two hinged flaps or panels 51, 52 which do not overlap each other and the longitudinally extending edges 53, 54 of the flaps 51, 52, respectively, when the bin 50 is in its erected condition, are spaced closely adjacent to each other. The flaps 51, 52 depend from the lowermost edges of the bin side walls 55, 56, respectively. As in the construction of the bin 11, the bottom wall of the bin 50 also includes a pair of bottom flaps or panels 57, 58 hingedly connected to the lowermost edges of the end wall panels 59, 60, respectively, which are adapted to overlie and abut the bottom flaps 51, 52 when the bin 50 is in its erected condition, as shown in FIGURE 8. From the foregoing, it will be appreciated that while the bottom wall of the erected bin 11 has an overall thickness equivalent to three thicknesses of the corrugated paper board material of which the bin 11 is made, the overall thickness of the bottom wall of the bin 50 is equivalent to only twice the thickness of the corrugated paperboard material. Thus, in order to increase the strength and rigidity of the bottom wall of the bin 50 and to structurally interconnect the spacer blocks 61 of the pallet means, the pallet means includes a flat platform 62, made of corrugated paperboard material, which has the same configuration as the bottom wall of the erected bin 50. When the bin 50 is to be palletized, the platform 62 is positioned so as to cover the entire bottom wall of the bin 50 and is secured to the bottom flaps 51, 52 by means of adhesives or other fastening means such as staples or the like.

In addition to the platform 62 and spacer blocks 61, the pallet means disclosed in FIGURES 8 and 9 also includes a base member 63 formed of a single sheet of corrugated paperboard. The base member 63 is coextensive with the platform 62 and is maintained in spaced relation thereto by means of the spacer blocks 61. The spacer blocks 61 are made of wood and are suitably secured to the base member 63 and the platform 62 by means of adhesive or the like. The graining of the wooden spacer blocks 61 runs generally perpendicular to the base member 63 and platform 62 and are arranged in three longitudinally extending, laterally spaced rows of three longitudinally spaced spacer blocks each.

From the foregoing, it will be appreciated that the pallet means is provided along each of its four sides with a pair of spaced openings, such as 64 and 65, 66 and 67, each of which leads into a passageway extending entirely across the pallet means between the base member 63 and the platform 62. Each passageway will accommodate the tine of a conventional fork lift truck and, thus, the fork of the lift truck may be run in between the base member 63 and platform 62 through the openings 64 and 65 or openings 66 and 67 from any one of the four sides of the pallet means.

Preferably the pallet means is supplied to the shipper in its preformed condition, as illustrated in FIGURE 9, with platform 62, base member 63 and spacer blocks 61 firmly secured together. To palletize the bin 50, the assembler merely unfolds and erects a bin 50 and attaches the platform to the bottom wall of the erected bin 50. It will be appreciated that the pallet means may be readily stored in a minimum amount of storage space by stacking them one upon the other. Similarly, the collapsed bins 50 which have an overall collapsed thickness of two thicknesses of corrugated paperboard material, lend themselves readily to be conveniently stacked in a relatively small storage space.

The embodiments of the invention chosen for the purposes of illustration and description herein are those preferred for achieving the objects of the invention and for developing the utility thereof in the most desirable manner, due regard being had to existing factors of economy, simplicity of design and construction, production methods, and the improvements sought to be effected. It will be appreciated, therefore, that the particular structural and functional aspects emphasized herein are not intended to exclude, but rather to suggest, such other adaptations and modifications as fall within the spirit and scope of the invention as defined in the appended claims.

What is claimed is:

1. A palletized container comprising a collapsible, box-like corrugated paperboard bin including an end wall and a side wall hingedly connected together and extending substantially normally with respect to each other when in its assembled condition, said bin being collapsible whereby said end and side walls are juxtaposed; and pallet means including a platform having adjacent edges coextensive with and adjacent to respective marginal edges of said side and end walls when said bin is in its assembled condition, said platform being integrally formed with a single one of said end and side walls and having one of said adjacent edges hingedly connected to a single one of said respective marginal edges of said end and side walls, said platform partially defining the bottom wall means of said assembled bin, a plurality of corrugated paperboard, elongated strips, said strips being substantially identically formed and each is provided with a plurality of spaced, substantially U-shaped pockets along its length, a spacer block disposed within each of said pockets, means for retaining each spacer block in its respective pocket, said strips being arranged on and adhesively secured to the exterior surface of said platform so as to be spaced and parallel with respect to each other and whereby each spacer block of one strip is in alignment with respective spacer blocks of the other strips and said spacer blocks project outwardly from the exterior surface of said platform, the adjacent pockets of each of said strips and the pockets of adjacent strips defining therebetween passageways for lift truck entry beneath said platform.

2. A palletized container as set forth in claim 1, wherein each of said spacer blocks is adhesively secured to said exterior surface of said platform and comprises a plurality of corrugated paperboard pieces adhesively secured together face-to-face with the corrugations thereof perpendicular to said platform, and each of said strips has a length substantially coextensive with said one of said adjacent edges of said platform hingedly connected to one of said respective marginal edges of said end and side walls.

References Cited by the Examiner

UNITED STATES PATENTS

| | | | |
|---|---|---|---|
| 2,446,914 | 8/1948 | Fallert | 206—60 |
| 2,493,562 | 1/1950 | Yarman | 108—58 |
| 2,494,730 | 1/1950 | Thursby. | |
| 2,534,011 | 12/1950 | Frye | 229—23 |
| 2,611,569 | 9/1952 | Coleman et al. | |
| 2,691,499 | 10/1954 | Watts | 229—14 |
| 2,729,383 | 1/1956 | King | 229—23 X |
| 2,902,199 | 9/1959 | Breton | 206—60 X |
| 3,026,015 | 3/1962 | Severn | 206—60 |
| 3,073,500 | 1/1963 | Goodrich et al. | 229—14 |
| 3,127,084 | 3/1964 | Williams | 217—43 |

FOREIGN PATENTS

| | | |
|---|---|---|
| 450,393 | 8/1948 | Canada. |
| 923,462 | 2/1947 | France. |

FRANKLIN T. GARRETT, *Primary Examiner.*